March 24, 1936. W. E. DOUGHERTY 2,034,695
CABLE COUPLING
Filed Nov. 15, 1934
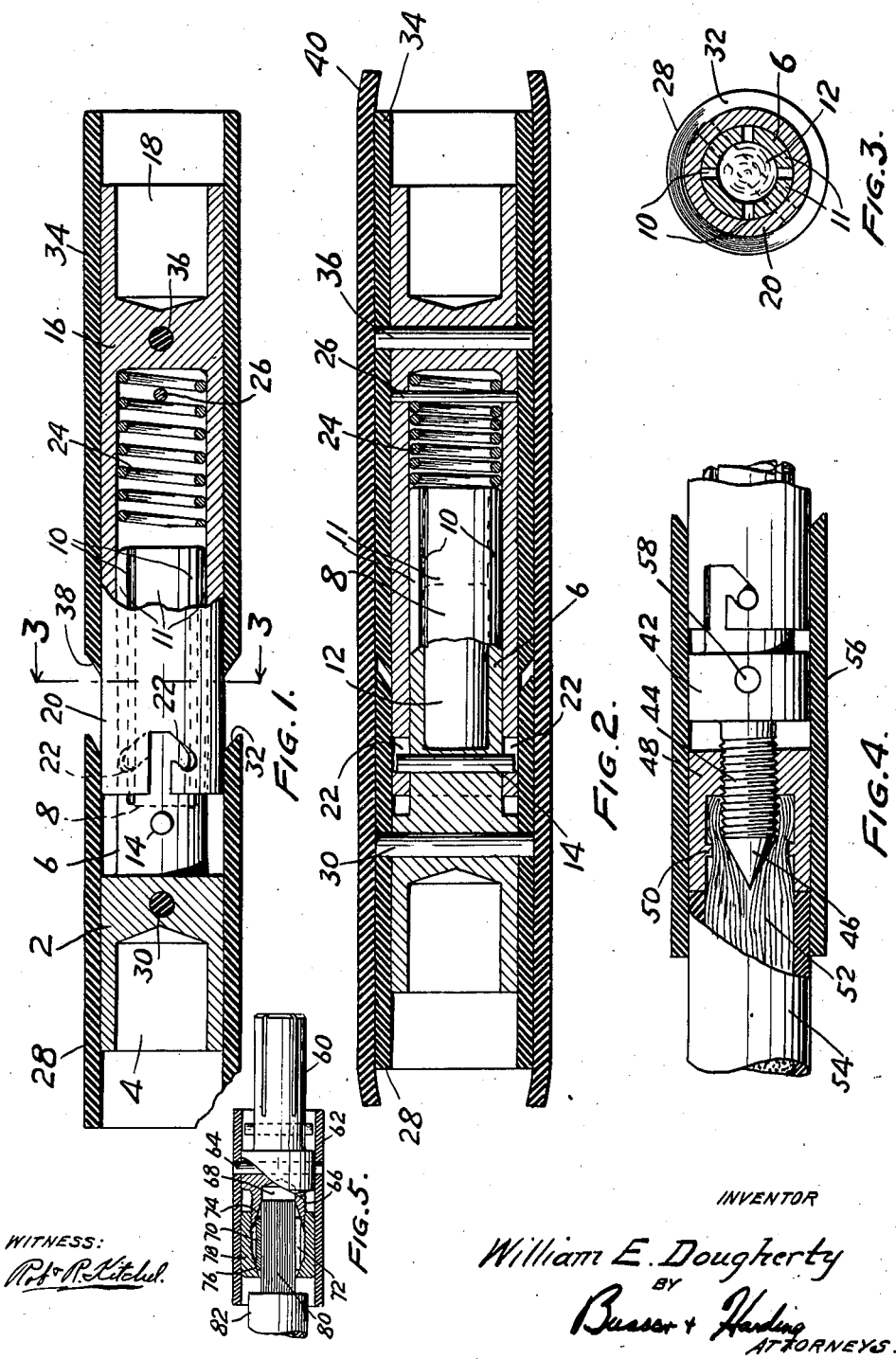
INVENTOR
William E. Dougherty
BY
Busser + Harding
ATTORNEYS.

Patented Mar. 24, 1936

2,034,695

UNITED STATES PATENT OFFICE 2,034,695

CABLE COUPLING

William E. Dougherty, Philadelphia, Pa., assignor to The Dallett Company, Philadelphia, Pa., a corporation of Pennsylvania Application November 15, 1934, Serial No. 753,073

2 Claims. (Cl. 173—363)

This invention relates to cable coupling particularly designed for the connection of sections of heavy electric welding cable.

This application is in part a continuation of my prior application Serial No. 718,752, filed April 3, 1934.

Couplings for cable sections are not only necessary in order to provide ready means for varying total lengths of cables but also to connect sections of a cable which may have become broken or from which the insulation may have been worn locally to an excessive degree.

Couplings heretofore provided have been somewhat unsatisfactory inasmuch as they could not maintain connection between the sections when the cable was subjected to the ordinary rough usage. In general, coupling members included plug and socket elements connected to the ends of the sections to be joined which maintained their engagement only frictionally and consequently readily became disconnected if the cable was drawn over a surface or subjected to any unusual tension. The socket member was, in general, slitted and jacketed by a fibre tube having a tendency to contract the slitted sections of the socket member upon the plug. The cable sockets of both members were tinned so that the cable ends could be soldered therein.

In accordance with the present invention there is provided a type of coupling particularly designed for a welding cable in which the connection between the two coupling elements not only provides a proper electrical contact to carry the electric welding currents but also insures that in any ordinary use the members of the coupling cannot become disconnected. Because of the heavy currents which are necessarily carried by the coupling the electric connection between the plug and socket members must be a good one. If it is faulty or offers any substantial resistance the heavy currents will produce heating and arcs which will rapidly destroy the contacting surfaces. In order to insure a tight contact the plug member is made of tubular form and is longitudinally slitted so that the separate prongs may resiliently yield to permit conformation to the coacting contact surfaces of the socket. To insure proper contacting a rubber plug is inserted within the opening in the plug member to press the sections outwardly and insure a parallel type of contact over the entire over-lapping areas.

Inasmuch as the welding cables are frequently dragged over conducting surfaces, as for example, decks of ships on which there may be small pieces of conductive metal such as nails, wire or the like, it is necessary to insure that the coupling does not afford the possibility of grounding of the cable to such conductive surfaces. A bayonet type of joint necessarily involves a movement in one direction followed by a slight reversal and hence complete insulation cannot be afforded by cylindrical outer insulating casings for the coupling elements if such casings are cut off at right angles to the axis. In accordance with the present invention a proper insulation is afforded without involving any construction which weakens the insulation or makes it liable to breakage because of rough handling. Furthermore, in accordance with the invention, the hard insulation is arranged to protect the pin of the bayonet joint against damage when the coupling elements are disconnected. The metallic parts of the coupling elements are connected to the insulating sleeves by insulating pins to avoid possibility of grounding.

In the simplest form of the invention the coupling members are provided with tinned sockets as in the type of couplings previously used, so that connection of the cable ends may be readily effected by soldering. Such type of connection is quite satisfactory where the cable is being used in a plant with soldering means available. In the field, however, soldering means is not generally available, and consequently if breakage occurs this type of coupling member cannot be used to reconnect newly provided cable ends. It is accordingly a further object of the present invention to provide a novel type of connecting means for securing a cable end to a coupling member. The means thus provided may be very simply used with no other preparation of a cable end than removal of a short section of insulation. This type of connection is particularly valuable where there occurs, in field use, a breakage of a cable, or where a removal of insulation occurs to such extent that cutting out of a section of the cable is necessary and recoupling of new ends required.

Further detailed objects of the invention will be apparent from the following description read in conjunction wtih the accompanying drawing, in which:

Fig. 1 is a longitudinal section through the members of the preferred form of coupling showing the elements partially engaged;

Fig. 2 is a similar section showing the elements completely engaged and covered by an outer jacket;

Fig. 3 is a section taken on the plane indicated at 3—3 in Fig. 1;

Fig. 4 is a longitudinal section showing a type of modified coupling particularly suitable for field use; and Fig. 5 is a view similar to Fig. 4 showing a modified form of coupling suitable for field use.

Referring first to Figs. 1 and 2, the plug member 2 is provided with a socket 4 into which the cable end may be soldered. If the soldered type of connection is to be replaced by a type more suitable for field use the socket arrangement will be replaced by a type of connection such as indicated in Figs. 4 and 5 which will be referred to later. The plug proper indicated at 6 is provided with a cylindrical bore 8 extending from its free end inwardly to such extent as to provide in conjunction with longitudinally extended slits 10 a plurality of resilient prongs 11. When the plug member is disconnected from the socket these prongs are designed to flare outwardly at their free ends to a slightly conical form. This condition is attained not only due to their resilience, but also because of the additional effect of a resilient rubber plug 12 which is compressed within the bore 8 and serves to insure such flaring condition even though, through repeated use, the prongs may lose some of their elasticity. This is particularly possible because the metallic elements of the coupling are preferably formed of brass in order to attain the necessary high conductivity and ability to carry the large welding currents. Although the normal condition of the prongs 11 is as indicated above, they are so shaped that when compressed inwardly by reception within the cylindrical bore of the socket member their outer surfaces are accurately cylindrical and provide good surface contact with the cylindrical bore of the socket member. Such contact is absolutely necessary to prevent damage due to arcing when heavy currents are carried.

At the base of the plug 6 there is carried a transverse pin 14 providing a plurality of pin elements for the bayonet joint.

The socket member indicated at 16 is provided with cable engaging means indicated in Figs. 1 and 2 as a soldering socket 18. This socket may, of course, be replaced by other type of cable connecting means such as indicated in Figs. 4 and 5. The socket member 16 is provided with a cylindrical socket portion 20 for the reception of the plug 6. This socket portion 20 is provided with bayonet slots 22 designed to co-act with the ends of the pin 14. To prevent accidental separation of the coupling members a spring 24 is retained in the lower portion of the socket 20 by a transverse pin 26 and must be compressed when the coupling members are brought together in order to cause the pin 14 to move past the bend in the bayonet slots 14. When the coupling members are then slightly relatively turned the spring forces the pin into the sockets of the bayonet slots thus holding the coupling members fixedly together. It will be obvious that disconnection of the coupling members cannot thereafter be effected without compression of the spring followed by a reverse relative rotation. The bayonet slots are preferably formed by milling.

The coupling members are individually insulated by hard fibre jackets, indicated at 28 and 34, secured to their respective coupling elements by removable transverse fibre pins 30 and 36 extending through aligned holes in the jackets and members. The jacket of the plug member is arranged so as to extend beyond the pin 14 which is accordingly protected against damage by rough usage if the plug member contacts with any bodies while the coupling members are disconnected. By reason of this the connection of the elements of the bayonet joint is hidden and therefor the proper alignment cannot be readily determined when an attempt is made to couple the two members. In order to serve as guides to enable the coupling members to be properly positioned relative to each other the pins 30 and 36 are preferably colored differently from the jackets 28 and 34 and are so arranged that when the bayonet joint elements are in proper relationship for connection the pins are lined up in a predetermined relationship.

From the nature of the bayonet joint it will be obvious that connections between the coupling members are effected when they move apart to some extent after being pressed together. In order to insure a proper coverage of the metallic parts by insulation in spite of this movement the members 20 and 34 are oppositely beveled as indicated at 32 and 38 with the result that when coupling is effected it is impossible for any radially extending metallic member to contact with the outer surfaces of the socket 20. This will be obvious from an inspection of Fig. 2. The space which exists between the fibre jackets and which necessarily must exist to permit coupling and uncoupling is of such nature that it is almost impossible for accidental grounding to occur. At the same time the fact that the fibre jackets are merely beveled insures that their strength is not substantially reduced so as to permit ready breakage by rough usage. In general the jackets of the coupling members are covered by a boot 40 of rubber when the coupling is being used. When coupling is being effected this boot may be moved along one of the cables and later moved to a position to cover the fibre jackets. The boot is particularly designed to prevent grounding and protect the coupling against moisture.

Fig. 4 shows one form of cable connection designed for field use. While the connecting means is shown attached to the plug member it will be clear that an identical element will be attached to the socket member. Extending from the plug member 42 there is a threaded pin 44 having a pointed end 46. Threaded on the pin 44 is a nut member 48 partially counterbored as indicated, and provided with an annular offset or shoulder 50. The cleaned end 52 of an insulated cable 54 is readily engaged upon the pin 46 and caused to flare when the nut is threaded outwardly until the point projects only slightly into the counterbore. By then turning the elements so as to force the nut inwardly upon the screw 44, the wires forming the end of the cable are compressed by the shoulder 50 and jammed as indicated in Fig. 4 inside the shank thus making a secure hold with excellent electric contact. The attachment may be facilitated by removing the jacket. The pin may, of course, be replaced by a screw. The socket member may be arranged for connection in the same fashion.

In Fig. 5 there is illustrated a modified arrangement for securing a cable to one of the coupling members. In this case the plug 60 is associated with its jacket 62 by means of a transverse pin 64. A threaded thimble 66 is provided which is bored as indicated at 68 to receive the end of a cable indicated at 80 from which the end portion of insulation 82 has been removed. The end of the bore of the thimble 66 is beveled as indicated at 74 and is designed to be engaged by a cylindrical bushing indicated at 70, slit lengthwise at 72. The outer end of this bushing may be engaged by a similar beveled surface 76 formed on the inside of a nut member 78 which is internally threaded to engage the threads of the thimble 66. In order to secure a cable end in this connecting means the nut 78 is first threaded outwardly whereupon the slit 72 of the bushing 70 permits the bushing to expand to readily receive the cable end. By threading the nut 78 inwardly the beveled surfaces 74 and 76 compress the bushing 70 to cause it to tightly engage the wires 80 and thus create a good mechanical and electrical connection. In this case also, the socket member may be provided with a similar connecting arrangement.

It will be clear that variations in the specific embodiments of the invention may be made without departing from the spirit thereof as defined in the following claims.

What I claim and desire to protect by Letters Patent is:

1. Cable coupling means comprising a plug member, means for connecting the plug member to a cable end, a socket member arranged to receive the plug member, means for connecting the socket member to a cable end, a bayonet joint whereby the members may be connected, and hard insulating jackets carried by the members, the jackets being respectively inwardly and outwardly beveled at their adjacent ends and secured to the members in such relationship that the members may be moved towards each other to release the bayonet joint but the metallic parts of the coupling are covered radially by insulation at the separation of the jackets when coupled.

2. Cable coupling means comprising a plug member, means for connecting the plug member to a cable end, a socket member arranged to receive the plug member, means for connecting the socket member to a cable end, a bayonet joint whereby the members may be connected, and hard insulating jackets carried by the members, the jackets being arranged to overlap at their adjacent ends and secured to the members in such relationship that the members may be moved towards each other to release the bayonet joint but the metallic parts of the coupling are covered radially by insulation at the separation of the jackets when coupled.

WILLIAM E. DOUGHERTY.